US005466422A

United States Patent [19]

von Leeuwen

[11] Patent Number: 5,466,422

[45] Date of Patent: Nov. 14, 1995

[54] DIELECTRIC-FORMING SHEATH FOR ELECTRODES FOR CORONA PRE-TREATMENT INSTALLATIONS

[75] Inventor: Jurmin von Leeuwen, Aichach, Germany

[73] Assignee: Sutter Apparatebau AG, Switzerland; a part interest

[21] Appl. No.: 48,862

[22] Filed: Apr. 16, 1993

[30] Foreign Application Priority Data

Apr. 21, 1992 [CH] Switzerland .......................... 01294/92

[51] Int. Cl.[6] .................................................. B01J 19/08

[52] U.S. Cl. ....................................... 422/186.05; 422/907

[58] Field of Search .............................. 422/186, 186.05, 422/907

[56] References Cited

U.S. PATENT DOCUMENTS

| | | | |
|---|---|---|---|
| 3,409,537 | 11/1968 | Cannon | 204/312 |
| 3,419,489 | 12/1968 | Delaney, Jr. | 204/312 |
| 3,871,980 | 3/1975 | Butcher, Jr. | 204/164 |
| 3,973,132 | 8/1976 | Prinz et al. | 250/531 |
| 4,153,560 | 5/1979 | Dinter et al. | 250/531 |
| 4,239,973 | 12/1980 | Kolbe et al. | 250/531 |
| 4,273,635 | 6/1981 | Beraud et al. | 204/165 |
| 4,507,266 | 3/1985 | Satoh et al. | 422/186.15 |
| 4,770,858 | 9/1988 | Collins | 422/186.18 |
| 4,869,881 | 9/1989 | Collins | 422/186.18 |
| 5,272,414 | 12/1993 | Iwanaga | 313/631 |

*Primary Examiner*—Donald P. Walsh
*Assistant Examiner*—Daniel J. Jenkins
*Attorney, Agent, or Firm*—Speckman, Pauley & Fejer

[57] ABSTRACT

A dielectric sheath to cover the electrodes (3) of corona pre-treatment installations in the form of small ceramic pipes. The sheath forms cutouts (17), by which the electrode mounting (4) can be guided through the sheath (6) to the electrode (3). The sheath (6) extends beyond the electrode (3) on both ends by an arbitrary length. As a result, it is possible to utilize electrodes which are shorter than the grounded cylinder (1) located underneath them. The shape of the cutouts and the design of the electrode mountings (4) can now be embodied in various ways.

5 Claims, 1 Drawing Sheet

DIELECTRIC-FORMING SHEATH FOR ELECTRODES FOR CORONA PRE-TREATMENT INSTALLATIONS

BACKGROUND OF THE INVENTION

1. Field of the Invention

This invention relates to a dielectric sheath for electrodes of corona pre-treatment installations comprising a grounded cylinder and electrodes with electrode mounts which maintain the electrodes at a defined distance from the grounded cylinder.

2. Description of Prior Art

It is necessary to pre-treat the surface of plastic foils and labels made therefrom, so that they can be permanently imprinted. This is achieved by so-called corona pre-treatment installations which change the molecular structure of the surface. Installations of this type are known in various forms. They consist of different components, namely a high frequency generator, a high voltage transformer, a grounded cylinder over which the foil of the labels which are to be treated is guided, and a plurality of electrodes distributed around the periphery of the grounded cylinder.

Although installations of this type have proven themselves over a long period of time, there are some problems in connection with them. One problem is that the space for the component of the corona pre-treatment installation which comprises the grounded cylinder and the electrodes is extremely limited.

For this reason, it is desired, on the one hand, to obtain as great a width as possible for treatment and, on the other hand, to keep the total width of the components as narrow as possible.

Up to now, this has not been satisfactorily achieved. The reasons for this are the electrodes and their sheaths which form the dielectric. Customarily, such electrodes have consisted of metal bars which were replaceably fastened on appropriate mountings and which were sheathed in a silicon hose. Because comparatively high temperatures are generated in the course of the high frequency discharges between the electrodes and the grounded cylinder, it is necessary to rotate the electrodes continuously during operation. Of course, this requires a relatively extensive mechanical outlay. Nevertheless, the service life of the dielectric, i.e. the silicon hose, is very limited. As a result, it is necessary to unscrew and replace the electrodes so that they can be sent to the supplier for providing them with a fresh insulating sheath.

The sheathed electrodes are relatively expensive and accordingly the user often only stores a small amount. As a result, if replacement electrodes are lacking, there are often days-long work interruptions.

Another problem with the known sheathed electrodes is that the silicon hose itself contains insufficient moisture, thus requiring that the electrodes be longer than the sheath.

However, this necessarily means that the electrodes must be longer than the grounded cylinder and extend on both sides beyond the grounded cylinder so that no short circuit voltage breakdown between the non-insulated ends of the electrode and the grounded cylinder can occur. A natural result of this is either a greater width of the component of the corona pre-treatment installation or a shorter grounded cylinder, which in turn leads to a reduction of the processing width.

SUMMARY OF THE INVENTION

It is an object of this invention to provide a dielectric sheath for electrodes of corona pre-treatment installations by which the previously described problems can be solved.

This object is attained by a dielectric sheath for electrodes of a corona pre-treatment installation having a grounded cylinder and electrodes mounted to maintain the electrodes at a defined distance from the grounded cylinder in accordance with one embodiment of this invention comprising a ceramic sleeve which is longer than the electrode to be sheathed. In an area remote from the grounded cylinder, the ceramic sleeve forms at least one recess through which the electrode mounts are guided.

BRIEF DESCRIPTION OF THE DRAWINGS

These and other features of this invention will be better understood from the following detailed description in conjunction with the drawings wherein.

DESCRIPTION OF PREFERRED EMBODIMENTS

Figure 1:
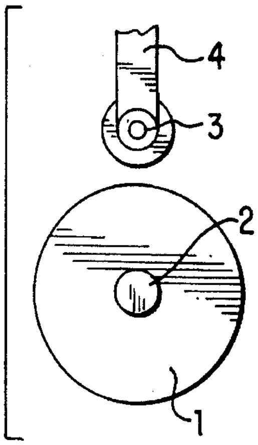
FIG. 1 is an end view of a sheathed electrode disposed above a grounded cylinder.

A grounded cylinder 1 with the shaft 2 extending through it can be seen in FIG. 1. At least one electrode 3 is disposed respectively at a distance above the grounded cylinder 1 and parallel to its axis. For the sake of simplicity, only one such electrode is shown; however, four to six electrodes are customary, depending on the size of the corona pre-treatment installation. Each electrode is attached to an electrode mounting. The electrical current supply 8 is provided through the electrode mounting. In the various embodiments, the connection between the electrode 3 and the electrode mounting 4 is made by appropriate fastening screws 5. These extend through the electrode mounting 4 and engage corresponding threaded blind bores axially extending in the electrode 3.

Figure 2:
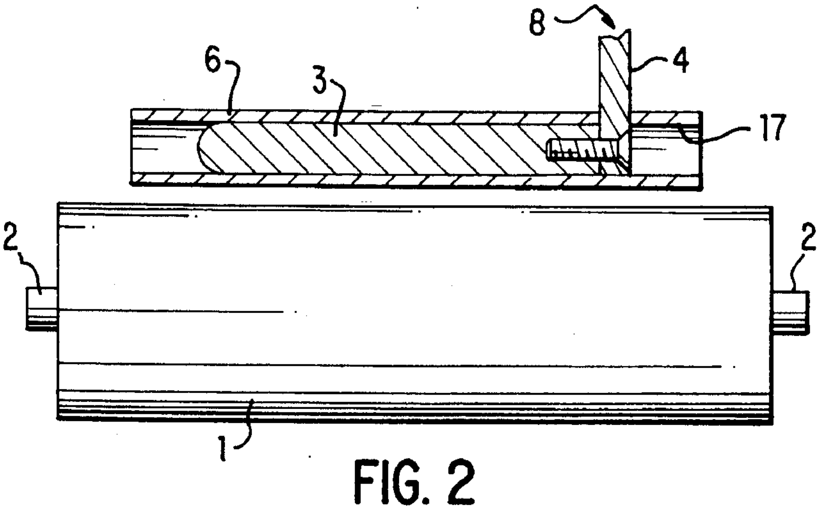
FIG. 2 is a partial cross-sectional side view of the sheathed electrode disposed above a ground cylinder shown in FIG. 1.
Figure 3:
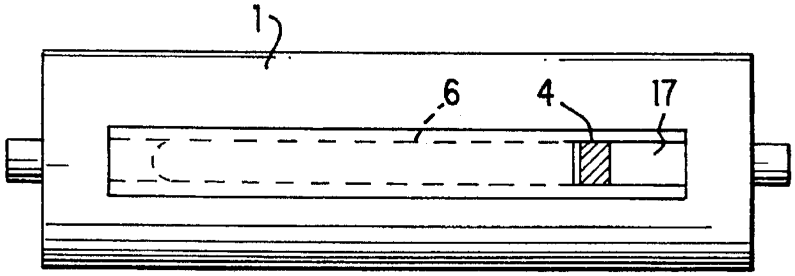
FIG. 3 is a plan view of the sheathed electrode and associated grounded cylinder shown in FIG. 2.

In accordance with the embodiment of this invention shown in FIGS. 1 to 3, the electrode 3 is a rod fastened on one end. A small ceramic pipe 6 constitutes the sheath. It has an elongated slit 17 disposed on one side as a cutout. The small ceramic pipe 6 used as the dielectric overlaps the electrode 3 on both ends. As a result, it can be clearly seen in the plan view in accordance with FIG. 3 that the sheath 6 encloses the electrode mounting 4 in the area of the cutout or slit 17 on the one side.

Compared to customary silicon hoses, such a small ceramic pipe as the sheath 6 has a considerably longer service life. In addition, operation with electrodes 3 of various lengths is possible. In particular, it is possible to use considerably shorter electrodes which correspond to the width of the plastic foil to be pre-treated.

Figure 4:
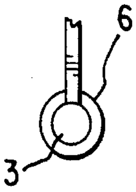
FIG. 4 is an end view of a sheathed electrode in accordance with another embodiment of this invention.
Figure 5:
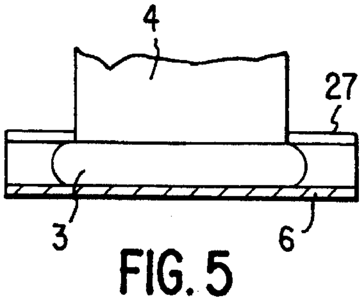
FIG. 5 is a partial cross-sectional side view of the sheathed electrode shown in FIG. 4.

In accordance with another embodiment as shown, in FIGS. 4 and 5, electrode 3 is again approximately rod-shaped, and it is connected as one piece to the electrode mounting 4, in the form of a welded-on support plate. The dielectric sheath again is in the form of a small pipe, but, in this case, the cutout is embodied as a continuous slit 27. Such an embodiment is particularly inexpensive to manufacture, because it can be made as a continuous piece and only needs to be cut to fit the electrodes 3.

Figure 6:
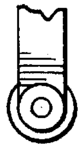
FIG. 6 is an end view of a sheathed electrode in accordance with one embodiment of this invention.
Figure 7:
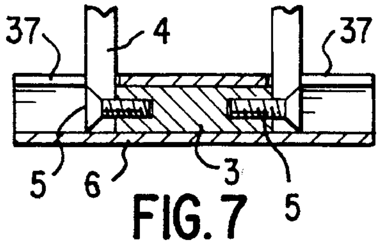
FIG. 7 is a partial cross-sectional side view of the sheathed electrode shown in FIG. 6.

In accordance with the embodiment of this invention shown in FIGS. 4 and 5, free relative displacement of the sheath 6 with respect to the electrode 3 is possible. This is not possible in accordance with the embodiment of this invention shown in FIGS. 6 and 7. In accordance with the embodiment shown in FIGS. 6 and 7, the sheath comprises a small ceramic pipe having cutouts in the form of elongated slits 37 disposed on both ends in alignment with each other. For replacing the sheath 6, it is necessary to unscrew one of the two fastening screws 5 and to remove one side of the electrode mounting 4, before the sheath can be slipped on. After that the electrode mounting 4 must again be inserted into one of the two elongated slits 37 and the fastening screw 5 must again be tightened.

Figure 8:
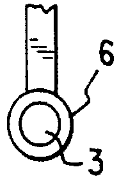
FIG. 8 is an end view of yet another embodiment of a sheathed electrode in accordance with this invention.
Figure 9:
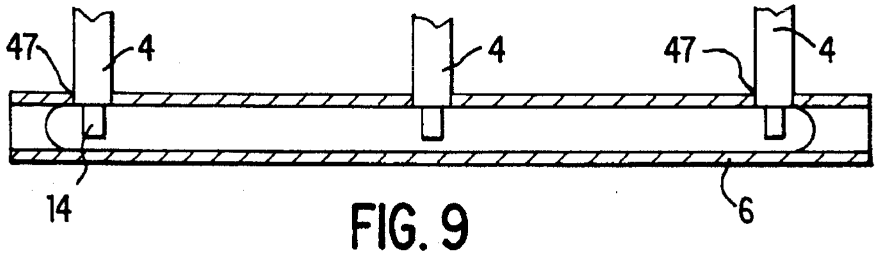
FIG. 9 is a partial cross-sectional side view of the sheathed electrode shown in FIG. 8.

Another embodiment of the dielectric sheath of this invention is illustrated in FIGS. 8 and 9. These exemplary embodiments should not be considered as complete or especially as final in any way. This embodiment is again based on a rod-shaped electrode 3, but its fastening in the electrode mountings 4 is not achieved with fastening screws in an axial direction. Instead, the mountings themselves are embodied as rotatable pins and have threaded bolts 14 on one end which can be screwed into the blind bores which correspondingly extend radially. Here, again, the sheath 6 is embodied as a small ceramic pipe having cutouts in the form of radial bores 47 for guiding the electrode mountings 4 through. The diameter of the radial bores 47 is slightly larger than the diameter of the electrode mountings 4 designed as rotatable pins.

Although the sheaths 6 have been respectively illustrated as small cylindrical pipes, cross-sectional shapes different from this can be used in certain cases of employment.

Because the actual electrodes 3 are not subjected to any noticeable wear in the course of the corona treatment, they never need to be replaced unless they sustain mechanical damage. They, accordingly, remain constantly in the printing operation. The sheaths 6 are extremely easy to replace and can therefore be replaced in the printing plant by the specialist staff. A positive side effect is that the used-up small ceramic pipes do not present a problem in connection with their disposal.

What is claimed is:

1. In a dielectric sheath (6) for an electrode (3) of a corona pre-treatment installation comprising at least one said electrode with an electrode mounting (4) which maintains said at least one electrode (3) at a defined distance from grounded cylinder, the improvement comprising: the dielectric sheath (6) comprising a ceramic sleeve longer than the electrode (3) and, and with at least one recess through said sleeve (17), through which the electrode mounting (4) is guidable.

2. In a dielectric sheath in accordance with claim 1, wherein said dielectric sheath (6) is a pipe, said pipe forming an elongated slit (17) on one end of said pipe through which the electrode mounting (4) is guidable.

3. In a dielectric sheath in accordance with claim 2, wherein said pipe forms said elongated slit (37) on each end through which the electrode mounting (4) is guidable.

4. In a dielectric sheath in accordance with claim 1, wherein said dielectric sheath (6) is a pipe, said pipe forming an elongated slit (27) extending over the entire length of said pipe through which the electrode mounting (4) is guidable.

5. In a dielectric sheath in accordance with claim 1, wherein said dielectric sheath (6) is a pipe, said pipe forming a plurality of bores disposed on a line through which the electrode mountings (4) are guidable.

* * * * *